United States Patent
Shishaku et al.

(10) Patent No.: US 10,214,654 B2
(45) Date of Patent: Feb. 26, 2019

(54) METHOD FOR FORMING MULTILAYER COATING FILM

(71) Applicant: NIPPON PAINT AUTOMOTIVE COATINGS CO., LTD., Osaka (JP)

(72) Inventors: Tomomichi Shishaku, Osaka (JP); Hirotaka Ogawa, Osaka (JP); Hirokazu Togai, Osaka (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 0 days.

(21) Appl. No.: 14/764,747

(22) PCT Filed: Feb. 3, 2014

(86) PCT No.: PCT/JP2014/052425
§ 371 (c)(1),
(2) Date: Jul. 30, 2015

(87) PCT Pub. No.: WO2014/119781
PCT Pub. Date: Aug. 7, 2014

(65) Prior Publication Data
US 2015/0368484 A1   Dec. 24, 2015

(30) Foreign Application Priority Data

Feb. 4, 2013 (JP) .................................. 2013-019628

(51) Int. Cl.
| B05D 7/00 | (2006.01) |
| C09D 133/10 | (2006.01) |
| C09D 7/00 | (2018.01) |
| C09D 133/06 | (2006.01) |
| C09D 7/43 | (2018.01) |
| C08L 77/00 | (2006.01) |

(52) U.S. Cl.
CPC ............. *C09D 7/002* (2013.01); *B05D 7/572* (2013.01); *C09D 7/43* (2018.01); *C09D 133/06* (2013.01); *C09D 133/10* (2013.01); *B05D 2451/00* (2013.01); *C08L 77/00* (2013.01)

(58) Field of Classification Search
None
See application file for complete search history.

(56) References Cited

U.S. PATENT DOCUMENTS

| 5,635,564 | A * | 6/1997 | Wieditz | B05D 7/532 |
| | | | | 427/407.1 |
| 2002/0086162 | A1 | 7/2002 | Masuda et al. | |
| 2002/0104760 | A1* | 8/2002 | Tomizaki | B05D 7/542 |
| | | | | 204/501 |
| 2003/0109664 | A1* | 6/2003 | Adams | C08G 18/022 |
| | | | | 528/44 |
| 2003/0139512 | A1* | 7/2003 | Wegner | C09D 175/00 |
| | | | | 524/445 |
| 2003/0175437 | A1 | 9/2003 | Tsuda et al. | |
| 2004/0228975 | A1* | 11/2004 | Takesako | B05D 7/572 |
| | | | | 427/372.2 |
| 2006/0188656 | A1* | 8/2006 | Katsuta | C09D 133/14 |
| | | | | 427/407.1 |
| 2008/0292802 | A1* | 11/2008 | Tonomura | B05D 7/14 |
| | | | | 427/393.5 |
| 2014/0004365 | A1 | 1/2014 | Kitazono et al. | |

FOREIGN PATENT DOCUMENTS

| CA | 2864387 | 1/2014 | |
| JP | 2001-9357 | 1/2001 | |
| JP | 2004-066034 | 3/2004 | |
| JP | 2004-290714 | 10/2004 | |
| JP | 2004-358462 | 12/2004 | |
| JP | 2009-262002 | 11/2009 | |
| JP | 2010-253378 | 11/2010 | |
| JP | WO 2012002569 A1 * | 1/2012 | ............... B05D 7/14 |
| JP | 2012-116879 | 6/2012 | |
| WO | 00/35600 | 6/2000 | |
| WO | 2010/122386 | 10/2010 | |
| WO | 2012/137864 | 10/2012 | |

OTHER PUBLICATIONS

International Search Report dated Apr. 28, 2014 in International (PCT) Application No. PCT/JP2014/052425.
International Preliminary Report on Patentability dated Aug. 13, 2015 in International (PCT) Application No. PCT/JP2014/052425, with English translation.
Office Action dated Mar. 1, 2016 in corresponding Canadian Application No. 2,899,829.
Extended European Search Report dated Sep. 27, 2016 in corresponding European Application No. 14745385.6.
Office Action dated Nov. 16, 2016 in corresponding Mexico Patent Application No. MX/a/2015/010028 with English translation.

* cited by examiner

*Primary Examiner* — Francisco W Tschen
(74) *Attorney, Agent, or Firm* — Wenderoth, Lind & Ponack, L.L.P.

(57) ABSTRACT

Provided is a method for forming a multilayer coating film, said method being suitably applicable to a wet-on-wet coating process comprising: applying a first water-borne base coating material to form an uncured first water-based base coating; and then applying a second water-based base coating material without preheating the uncured first water-borne base coating. A method for forming a multilayer coating film according to a wet-on-wet coating process which comprises applying a first water-based base coating material to the surface of a substrate to be coated and then applying, without preheating the thus formed coating, a second water-based base coating material, characterized in that: the first water-borne base coating material contains a hydrophilic association-type viscous material; and the composition of the second water-based base coating material is controlled.

5 Claims, No Drawings

METHOD FOR FORMING MULTILAYER COATING FILM

TECHNICAL FIELD

This application has priority rights of Japanese patent application No. 2013-19628, filed Feb. 4, 2013, which is herein incorporated by references.

The present invention relates to a method for forming a multilayer coating film, especially, a method for forming a multilayer coating film of applying a first water-based base coating composition, a second water-based base coating composition and a clear coating composition by so-called wet on wet coating and simultaneously heating and curing the three layers.

BACKGROUND OF THE INVENTION

An automobile coating basically includes sequentially applying an electrodeposition coating film, a first base coating film (also called a water-based intermediate coating film), a second base coating film (also called a color base coating film) and a clear coating film on a steel plate as a coating material. In such a coating, there are two methods; one method includes multiple heating and curing per forming a composed coating film, and the other method includes a simultaneously curing of layered multiple coating films. In these methods, the method including a simultaneously curing of layered multiple coating films can omit a heating and curing step and provide an energy-saving coating, and is advantageous.

As a method for a simultaneously curing of layered multiple coating films, a three-coat and one-bake coating by successively forming a first base coating film, a second base coating film and a clear coating film by wet on wet coating and simultaneously heating and curing is performed. However, a conventional three-coat and one-bake coating requires a preliminary drying step (so-called a preheating step) by drying, for example, at 60 to 100° C. for 2 to 20 minutes after a first base coating composition is applied, especially in case that a water-base coating composition is used. The preheat step can prevent occurrence of mixing of two coating film layers (mixing of layers). The mixing of layers is generated when a second water-based coating film is formed on an uncured first water-based coating film immediately after the first water-based coating film is formed, and water and/or an organic solvent in an uncured second water-based coating film is (are) moved to the uncured first water-based coating film. The mixing of layers frequently deteriorates film appearance of resulting multilayer coating film.

On the other hand, further omission of a preheat step after forming an uncured first water-based base coating film has been required in view of further requirement for reduce burden on the environment such as reduction of $CO_2$ emission and energy saving. By contrast, resulting multilayer coating film requires no less excellent film appearance than ones obtained by conventional coating method.

JP 2001-009357 A (Patent Document 1) describes a coating formation method for successively forming an intermediate coating film using a water-based intermediate coating composition, a metallic base coating film using a water-based metallic base coating composition, and a clear coating film using a clear coating composition on a substrate, characterized in that the water-based intermediate coating composition and/or the water-based metallic base coating composition comprise(s) a polycarbodiimide compound and an aqueous resin having carboxyl group (claim 1). Patent Document 1 also discloses that the method can provide formation of multilayer coating film with excellent appearance by controlling affinity and bleeding in the interlayers between respectively neighboring layers in the case where the water-based intermediate coating composition and the base coating composition are successively formed on a substrate. However, the coating formation method includes a preheat step of 80° C. for 5 minutes (paragraph [0101]).

JP 2004-358462 A (Patent Document 2) describes a method for forming a multilayer coating film characterized by sequentially applying a water-based intermediate coating composition, a water-based base coating composition and a clear coating composition on an electrodeposition coating film by wet-on-wet coating and simultaneously heating and curing them, wherein the water-based intermediate coating composition comprises an acrylic resin emulsion having a glass transition temperature of −50 to 20° C., a solid acid value of 2 to 60 mgKOH/g and a solid hydroxyl value of 10 to 120 mgKOH/g, a urethane resin emulsion having a solid acid value of 5 to 50 mgKOH/g, and a curing agent (claim 1). Patent Document 2 also discloses that the method can provide a multilayer coating film having excellent smoothness of its surface with effectively preventing mixing of layers between an intermediate coating film and a base coating film. However, the method for forming a multilayer coating film also includes a preheat step of 80° C. for 5 minutes after applying the water-based intermediate coating composition (paragraph [0117]).

JP 2009-262002 A (Patent Document 3) describes a method for forming a multilayer coating film characterized by sequentially applying a water-based intermediate coating composition, a water-based base coating composition and a clear coating composition on an electrodeposition coating film by wet-on-wet coating and simultaneously heating and curing them, wherein the water-based intermediate coating composition comprises an acrylic resin emulsion having a solid hydroxyl value of 50 to 120 and a solid acid value of 20 to 60 mgKOH/g, a completely alkyl-etherified melamine resin having alkyl side chain group with 1-4 carbon atoms, and a carbodiimide compound (claim 1). Patent Document 3 also discloses that the method can prevent mixing of layers between an intermediate coating film and a base coating film in a three-coat-one-bake coating method. However, the method for forming a multilayer coating film also includes a preheat step of 80° C. for 5 minutes (paragraph [0162]).

JP 2012-116879 A (Patent Document 4) describes a water-based intermediate coating composition containing an acrylic resin emulsion and a curing agent, wherein addition of an aqueous dispersion of dimer acid derivative to the water-based intermediate coating composition provides formation of pseudo-crystalline state in the water-based intermediate coating composition and hydrophobicity to prevent transfer of solvents including water from a water-based base coating composition. However, in the method of Patent Document 4, complete deletion of a preheat step is difficult, and mixing of layers or sagging occurs.

PRIOR ART DOCUMENTS

Patent Documents

Patent Document 1: JP 2001-009357 A
Patent Document 2: JP 2004-358462 A
Patent Document 3: JP 2009-262002 A
Patent Document 4: JP 2012-116879 A

SUMMARY OF THE INVENTION

Problems to be Resolved by the Invention

The present invention is intended to solve the conventional problems described above. For more details, a main object of the present invention is to provide constituents of a first water-based base coating composition and a second water-based base coating composition without defects such as mixing of layers in a wet-on-wet coating including applying the first water-based base coating composition to form an uncured first water-based base coating film and applying the second water-based base coating composition thereon without curing.

Means of Solving the Problems

The present invention provides a method for forming a multilayer coating film including the steps of;
(1) applying a first water-based base coating composition on a surface of a coating material to form an uncured first water-based base coating film,
(2) applying a second water-based base coating composition on the uncured first water-based base coating film to form an uncured second water-based base coating film,
(3) applying a clear coating composition on the uncured second water-based base coating film to form an uncured clear coating film, and
(4) simultaneously heating and curing the uncured first water-based base coating film, the uncured second water-based base coating film and the uncured clear coating film formed in the steps (1), (2) and (3) to form a multilayer coating film, wherein
the first water-based base coating composition comprises a hydrophilic associated type viscosity agent, and
the second water-based base coating composition comprises a film forming resin, and the film forming resin comprises an acrylic emulsion resin (A), a water soluble acrylic resin (B) and a water soluble polyester resin (C), wherein
a rate represented by the following formula:

$$(A)/(A+B+C)$$

wherein (A) is a resin solid content by mass of the acrylic emulsion resin (A), and (A+B+C) is a total resin solid content by mass of the acrylic emulsion resin (A), the water soluble acrylic resin (B) and the water soluble polyester resin (C),
is from 40% to 60% expressed in percentage, in which the above problems can be solved.

The prevent invention may also include the embodiments described below:
the hydrophilic associated viscosity agent in the first water-based base coating composition is a polyamide type viscosity agent,
the acrylic emulsion resin (A) in the second water-based base coating composition comprises a single layered acrylic emulsion resin (a) and a core-shell type acrylic emulsion resin (b),
a viscosity at a temperature of 20° C. of the uncured first water-based base coating film after applying the second water-based base coating composition is from 45 to 100 Pa·s at a shear rate of 0.01/s, and
no heating or drying step is included between the step (1) and the step (2).

Advantageous Effect of the Invention

Inventors of the present invention have studied a coating method without defects such as sagging and mixing of layers even if the coating method includes no preheat step (pre-drying step) in the process of application of a first water-based base coating composition to form an uncured first water-based base coating film and applying a second water-based base coating composition on the uncured first water-based base coating film. A viscosity of a first water-based base coating film at 20° C. without preheat is from 50 to 100 Pa·s at a shear rate of 0.01/s. By contrast, a viscosity of a first water-based base coating film after a preheat step is more than 10,000 Pa·s at a shear rate of 0.01/s. The inventors tried to find correlation between sagging after application of a second water-based coating composition and a viscosity of a first water-based coating film on the assumption that a maximum viscosity of a first water-based coating film without preheat is about 150 Pa·s at a shear rate of 0.01/s. However, they did not find the correlation.

Therefore, the inventors measured a viscosity of a first water-based coating film after application of a second water-based coating composition in a special manner and investigated correlation between sagging and the viscosity. They have found correlation that high viscosity of a first water-based coating film after application of a second water-based coating composition provides decrease of sagging. For more detail, they have found that sagging frequently occurs when the viscosity at 20° C. and a shear rate of 0.01/s is less than 45 Pa·s, however generation of sagging significantly decrease when the viscosity is not less than 45 Pa·s. The present invention is achieved based on the above findings. The present invention is achieved by addition of a hydrophilic associated type viscosity agent to a first water-based coating composition and selecting constituents of a second water-based coating composition for preventing transfer of water in order to increasing viscosity of a first water-based coating film at the time of after application of a second water-based coating composition.

Application of constituents of the first water-based base coating composition and the second water-based base coating composition according to the present invention in a coating method by so-called wet-on-wet coating can prevent defects such as sagging or mixing of layers even if the coating step does not include a preheat step (in other words, a pre-drying step). The present invention can achieve omission of preheat step which is conventionally-required in making a multilayer coating film using water-based coating compositions. The present invention can provide energy omission required in a preheat step, furthermore, omission of coating time and coating step.

DETAILED DESCRIPTION OF THE PREFERRED EMBODIMENTS

First Water-Based Base Coating Composition

A first water-based base coating composition according to the present invention generally contains an acrylic emulsion resin and a curing agent. The first water-based base coating composition according to the present invention further contains a hydrophilic associated type viscosity agent. The first water-based base coating composition may contain a pigment and optional additives.

Acrylic Emulsion Resin

A glass transition temperature (Tg) of an acrylic resin which is composed of an acrylic emulsion resin may preferably be from −20° C. to 60° C., more preferably from −10° C. to 50° C., most preferably from 0° C. to 40° C. When a glass transition temperature (Tg) of the resin is less than −20° C., a mechanical strength of a coating film may deteriorate and a chipping resistance may lower. On the other hand, when a glass transition temperature (Tg) of the resin is more than 60° C., an impact resistance may deteriorate because of hardness and brittleness of a coating film and chipping resistance may lower. A glass transition temperature (Tg) of the acrylic emulsion resin can be calculated based on known glass transition temperatures (Tg) of monomer(s) and/or homopolymer(s) and amount rates of them.

A solid acid value of the acrylic resin which is composed of the acrylic emulsion resin may preferably be from 2 to 60 mgKOH/g, more preferably from 5 to 50 mgKOH/g. When a solid acid value of the resin is less than 2 mgKOH/g, storage stability, mechanical stability and freezing stability and the like of the acrylic emulsion resin or the first water-based base coating composition containing the acrylic emulsion resin may lower, and various strength of a coating film, chipping resistance and water resistance of a coating film may lower because of lack of sufficient curing property in a curing reaction for a curing agent such as a melamine resin. On the other hand, when a solid acid value of the resin is more than 60 mgKOH/g, polymerization stability of the resin or water resistance of a resulting coating film may lower. A solid acid value of the acrylic resin can be adjusted by selecting a kind of monomer(s) and/or an amount of monomer(s) to obtain a solid acid value in the range described above. As described below, it is important to use a monomer having carboxyl group as an ethylenically unsaturated monomer having acid group (ii). It may be preferable that an amount of the monomer having carboxyl group contained in the ethylenically unsaturated monomer having acid group (ii) is not less than 50% by mass, more preferably not less than 80% by mass.

A solid hydroxyl value of the acrylic resin which is composed of the acrylic emulsion resin may preferably be from 10 to 120 mgKOH/g, more preferably from 20 to 100 mgKOH/g. When a solid hydroxyl value of the resin is less than 10 mgKOH/g, mechanical strength of a coating film may lower, chipping resistance may lower and water resistance and solvent resistance may lower due to insufficient curing property in a curing reaction for a curing agent. On the other hand, when a solid hydroxyl value of the resin is more than 120 mgKOH/g, water resistance of a resulting coating film may lower, and various strength of a coating film, in particular, chipping resistance, solvent resistance and water resistance may lower, because compatibility with a curing agent becomes lower and strain of a coating film and unevenness of curing reaction may occur.

A solid acid value and a solid hydroxyl value of the acrylic resin can be calculated based on a solid acid value and a solid hydroxyl value of a monomer mixture used in a preparation of the resin.

The acrylic emulsion resin contained in the first water-based base coating composition used in the method for forming a multilayer coating film can be obtained by emulsion polymerization of a monomer mixture containing a (meth)acrylic acid alkyl ester (1), an ethylenically unsaturated monomer having acid group (ii) and an ethylenically unsaturated monomer having hydroxyl group (iii). Each compounds (i) to (iii) as a component in the monomer mixture exemplified below may be a singular compound or in an appropriate combination of two or more compounds.

The (meth)acrylic acid alkyl ester (i) is used as a component for making a main backbone of the acrylic emulsion resin. An example of the (meth)acrylic acid alkyl ester (i) includes methyl (meth)acrylate, ethyl (meth)acrylate, propyl (meth)acrylate, n-butyl (meth)acrylate, isobutyl (meth)acrylate, t-butyl (meth)acrylate, hexyl (meth)acrylate, 2-ethyl hexyl (meth)acrylate, octyl (meth)acrylate, nonyl (meth) acrylate, decyl (meth)acrylate, dodecyl (meth)acrylate, (meta)acrylic acid stearyl ester and the like. In this specification, for example, the term "methyl (meta)acrylate" represents methyl acrylate and methyl methacrylate.

The ethylenically unsaturated monomer having acid group (ii) is used as a component for improving various performance such as storage stability, mechanical stability and freezing stability of resulting acrylic emulsion resin and promoting curing reaction for a curing agent such as a melamine resin. The acid group may preferably be selected from carboxylic acid group, sulfonate group, phosphate group and the like. The most preferable acid group is carboxylic acid group in view of improving property of various stabilities described above and promoting property of curing reaction.

An ethylenically unsaturated monomer having carboxylic acid group includes, for example, acrylic acid, methacrylic acid, crotonic acid, isocrotonic acid, ethacrynic acid, propyl acrylic acid, isopropyl acrylic acid, itaconic acid, maleic anhydride, fumaric acid, and the like. An ethylenically unsaturated monomer having sulfonate group includes, for example, p-vinyl benzene sulfonic acid, p-acrylamide propane sulfonic acid, t-butyl acrylamide sulfonic acid, and the like. An ethylenically unsaturated monomer having phosphate group includes, for example, LIGHT-ESTER PM (produced by KYOEISHA CHEMICAL Co., LTD.), such as monophosphate of 2-hydroxyethyl acrylate, monophosphate of 2-hydroxypropyl methacrylate, and the like.

The ethylenically unsaturated monomer having hydroxyl group (iii) can provide the resulting acrylic resin emulsion with a hydrophilicity due to the hydroxyl group therein. The resulting acrylic resin emulsion can improve its application workability and anti-freezing stability of the resulting coating composition containing the emulsion, and provide the resulting resin emulsion with a curing reactivity to the curing agent such as melamine resin, isocyanate or the like.

The ethylenically unsaturated monomer having hydroxyl group (iii) includes, for example, 2-hydroxyethyl (meth)acrylate, 2-hydroxypropyl (meth)acrylate, 4-hydroxybutyl (meth)acrylate, N-methylolacrylamide, allyl alcohol, epsilon-caprolactone-modified acrylic monomer and the like.

The epsilon-caprolactone-modified acrylic monomer includes, for example, Placcel FA-1, Placcel FA-2, Placcel FA-3, Placcel FA-4, Placcel FA-5, Placcel FM-1, Placcel FM-2, Placcel FM-3, Placcel FM-4 and Placcel FM-5, which are produced by DAICEL CHEMICAL INDUSTRIES, LTD, etc.

The monomer mixture which is used for preparation of the acrylic emulsion resin may optionally contain at least one monomer selected from the group consisting of styrene monomers, (meth)acrylonitriles and (meth)acrylamides, in addition to the above monomers (i) to (iii). The styrene monomers include styrene and alpha-methyl styrene and the like.

Herein, the monomer mixture may further contain a crosslinkable monomer such as an ethylenically unsaturated monomer having carbonyl group, a monomer having hydrolyzable and polymerizable silyl group, various polyfunctional vinyl monomers and the like. In case that such a crosslinkable monomer is contained, the resulting acrylic emulsion resin becomes self-crosslinkable.

The ethylenically unsaturated monomer having carbonyl group includes, for example, a monomer having keto group such as acrolein, diacetone (meta)acrylamide, acetoacetoxyethyl (meta)acrylate, formyl styrol, alkyl vinyl ketone having 4-7 carbon atom (for example, methyl vinyl ketone, ethyl vinyl ketone, butyl vinyl ketone) and the like. In these monomers, diacetone (meta)acrylamide may preferably be used.

The monomer having hydrolyzable and polymerizable silyl group includes, for example, a monomer having alkoxysilyl group such as gamma-(meta)acryloxy propyl methyl dimethoxysilane, gamma-(meta)acryloxy propyl methyl diethoxysilane, gamma-(meta)acryloxy propyl triethoxysilane and the like.

The polyfunctional vinyl monomer is a compound having two or more radical-polymerizable ethylenically unsaturated groups. The polyfunctional vinyl monomer includes, for example, a divinyl compound such as divinylbenzene, ethyleneglycol di(meta)acrylate, hexanediol di(meta)acrylate, polyethyleneglycol di(meta)acrylate, allyl(meta)acrylate, 1,4-butanediol di(meta)acrylate, 1,6-hexane di(meta)acrylate, neopentylglycol di(meta)acrylate, pentaerythritol di(meta)acrylate and the like; and pentaerythritol tri(meta)acrylate, trimethylol propan tri(meta)acrylate, dipentaerythritol hexa(meta)acrylate and the like.

The acrylic emulsion resin used in the method for forming a multilayer coating film according to the present invention can be prepared by emulsion polymerization of a monomer mixture containing the above components (i) to (iii). The emulsion polymerization (an emulsion copolymerization) can be carried out, in the presence of a radical polymerization initiator and an emulsifier, by heating the above-described monomer mixture in an aqueous medium with stirring. A reaction temperature may preferably be within a range of, for example, from 30 to 100° C., and reaction time may preferably be within a range of, for example, from 1 to 10 hours. The reaction temperature can be controlled by adding dropwise a portion or whole of the monomer mixture or the pre-emulsified monomer mixture into a reaction vessel containing water and an emulsifier.

As the radical polymerization initiator, a known initiator for an emulsion polymerization to prepare a conventional acrylic resin may be used. The initiator includes, for example, a water-soluble free radical polymerization initiator, for example, a persulfate compound such as potassium persulfate, sodium persulfate, ammonium persulfate; an azo type compound such as 4,4'-azobis (4-cyanovaleric acid); and the like, which is used in an aqueous solution. A preferable initiator may include, for example, in an aqueous solution, a so-called redox initiator in a combination of an oxidizing agent, such as potassium persulfate, sodium persulfate, ammonium persulfate, hydrogen peroxide and the like; and a reducing agent, such as sodium hydrogensulfite, sodium thiosulfate, Rongalit, ascrobic acid and the like.

The emulsifier includes an anionic or nonionic emulsifier selected from amphipathic compounds, each of which has a hydrocarbon group having 6 or more of carbon atoms and a hydrophilic moiety, such as a carboxylate, a sulfonate or a sulfuric acid partial ester, in one molecule. The anionic emulsifier includes an alkaline metal salt or an ammonium salt of a half ester of sulfuric acid with an alkyl phenol or a fatty alcohol; an alkaline metal salt or an ammonium salt of an alkyl sulfonate or an allyl sulfonate; an alkaline metal salt or an ammonium salt of a half ester of sulfuric acid with a polyoxyethylene alkylphenyl ether, a polyoxyethylene alkyl ether or a polyoxyethylene allyl ether, etc. The nonionic emulsifier includes a polyoxyethylene alkylphenyl ether, a polyoxyethylene alkyl ether, a polyoxyethylene allyl ether, etc. The emulsifier may include another emulsifiers other than these conventional anionic and nonionic emulsifiers, such as various anionic and nonionic reactive emulsifiers, each of which has, in its molecule, a radically polymerizable unsaturated double bond-containing group, such as an acrylic group, a methacrylic group, a propenyl group, an allyl group, an allyl ether group, a maleic group, etc. An appropriate single emulsifier may be used alone, or two or more emulsifiers may be used in an appropriate combination.

Herein, during the emulsion polymerization, preferably, an auxiliary agent (a chain-transfer agent) in order to control the molecular weight may appropriately be used depending on the polymerization conditions, such as a mercaptan compound, a lower alcohol, alpha-methyl styrene dimer or the like. The auxiliary agent (a chain-transfer agent) can accelerate the emulsion polymerization, accelerate the formation of the resulting coating film with a smooth and uniform surface, and improve an adherence to the substrate, therefore, may preferably be used.

Herein, the emulsion polymerization includes any conventional polymerization, such as a polymerization including a continuous uniform addition of a monomer at a single stage; a core-shell polymerization including a multi-stage monomer feeding; a power feed polymerization wherein formulation of the monomers to be fed is continuously altered during the polymerization, etc. In case that a conventional continuous uniform addition of a monomer at a single stage is used, a single layered acrylic emulsion resin can be obtained. In case that a core-shell polymerization including a multi-stage monomer feeding is used, a core-shell type acrylic emulsion resin can be obtained.

The above-described emulsion polymerization can provide the acrylic emulsion resin which can be used in the present invention. A weight average molecular weight of an acrylic resin which composes the acrylic emulsion resin is generally, but is not particularly limited to, a range of from about 50000 to about 1000000, and a preferable range of from about 100000 to about 800000. The weight average molecular weight as used herein is a value measured by GPC (gel permeation chromatography) method, as a calculated reduced value with a polystyrene standard.

In the present invention, a base compound can be added to the resulting acrylic emulsion resin to improve dispersion stability of the acrylic emulsion resin by neutralization of all or partial carboxylic acid groups therein. The base compound includes, for example, ammonia compounds, various amine compounds, alkali metals and the like.

Curing Agent

The first water-based base composition may preferably contain a curing agent. The curing agent is not particularly limited, as long as the curing agent can provide curing reaction for the acrylic emulsion resin and can be added to the first water-based base coating composition. The curing agent includes, for example, a melamine resin, a blocked isocyanate resin, an oxazoline compound or a carbodiimide compound and the like. These curing agents may be used alone, or two or more curing agents may be used in an appropriate combination.

The melamine resin is not particularly limited, and a conventional melamine resin used as a curing agent can be used. The melamine resin may preferably be, for example, an alkyl-etherified melamine which is an alkyl-etherified compound, more preferably be a melamine resin which is substituted by methoxy group and/or butoxy group. A concrete example of the melamine resin includes, a melamine resin having mere methoxy group(s) such as Cymel 325, Cymel 327, Cymel 370, Mycoat 723;

a melamine resin having both of methoxy group(s) and butoxy group(s) such as Cymel 202, Cymel 204, Cymel 211, Cymel 232, Cymel 235, Cymel 236, Cymel 238, Cymel 251, Cymel 254, Cymel 266, Cymel 267, Cymel 285 (each of them is a product name, produced by Nihon Cytec Industries Inc.);
a melamine resin having mere butoxy group(s) such as Mycoat 506 (product name, produced by Mitsui Cytec Industries Inc.), U-Van 20N60, U-Van 20SE (each of them is a product name, produced by Mitsui Chemicals, Inc.) These melamine resins may be used alone, or two or more melamine resins may be used in a combination.

In these melamine resins, Cymel 211, Cymel 251, Cymel 285, Cymel 325, Cymel 327, Mycoat 723 may more preferably be used.

The blocked isocyanate resin is a prepared by blocking a polyisocyanate compound with a blocking agent. The polyisocyanate compound is not limited as long as the compound has two or more isocyanate groups in one molecular, and may be, for example,
aliphatic diisocyanates such as hexamethylene diisocyanate (HMDI), trimethylhexamethylene diisocyanate (TMDI) and the like;
aliphatic-cyclic diisocyanates such as isophorone diisocyanate (IPDI) and the like;
aromatic-aliphatic diisocyanates such as xylylene diisocyanate (XDI) and the like;
aromatic diisocyanates such as tolylene diisocyanate (TDI), 4,4-diphenylmethane diisocyanate (MDI) and the like;
hydrogenated diisocyanates such as dimer acid diisocyanate (DDI), hydrogenated TDI (HTDI), hydrogenated XDI (H6XDI), hydrogenated MDI (H12MDI) and the like; and biurets and nulates thereof, etc. The polyisocyanate compound may be used solely or in combination thereof.

The blocking agent employed for blocking the polyisocyanate compound is not limited and may include, example, an oxime type compound such as methyl ethyl ketoxime, acetoxime, cyclohexanone oxime and the like;
a phenol type compound such as m-cresol, xylenol and the like;
an alcohol type compound such as butanol, 2-ethylhexanol, cyclohexanol, ethyleneglycol monoethyl ether and the like;
a lactam type compound such as epsilon-caprolactam and the like;
a diketone type compound such as diethyl malonate, acetoacetic ester and the like;
a mercaptan compound such as thiophenol and the like;
a urea compound such as thiourea and the like;
an imidazole compound, a carbamic acid and the like.
In these compounds, the oxime type compound, phenol type compound, alcohol type compound, lactam type compound, diketone type compound may preferably be used.

The oxazoline compound may preferably a compound having two or more 2-oxazoline group, and includes, for example, the following oxazoline compounds and an oxazoline group-containing polymer. The oxazoline compound may be used alone, or two or more compounds may be used in an appropriate combination. The oxazoline compound may be prepared by the following methods of: dehydration reduction of amide alcohol in the presence of a catalyst with heating; synthesis of alkanolamine and nitrile; synthesis of alkanolamine and carboxylic acid; or the like.

The oxazoline compound may include, for example, 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinylcyclohexane)sulfide, bis-(2-oxazolinylnorbornane)sulfide and the like. The oxazoline compound may be used alone, or two or more compounds may be used in an appropriate combination.

The oxazoline group-containing polymer may be prepared by polymerization of addition-polymerizable oxazoline and optional at least one other polymerizable monomer. The addition polymerizable oxazoline may include, for example, 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline and the like. The oxazoline may be used alone, or two or more may be used in an appropriate combination. Above all, 2-isopropenyl-2-oxazoline may more preferably be used in view of industrially easily availability.

An amount of the addition-polymerizable oxazoline is not limited, and may be 1 mass % or more, based on an amount of the oxazoline group-containing polymer. When an amount of the addition-polymerizable oxazoline is less than mass %, insufficient curing may be obtained and durability and water resistance of a resulting coating film may be deteriorated.

The other polymerizable monomer is not limited as long as the monomer can react with the addition-polymerizable oxazoline and does not react with a oxazoline group. The other polymerizable monomer includes, for example, (meta)acrylic acid esters such as (meta)acrylic acid methyl, (meta)acrylic acid butyl, (meta)acrylic acid-2-ethyl hexyl and the like;
unsaturated nitriles such as (meta)acrylonitrile and the like;
unsaturated amides such as (meta)acrylic amide, N-methylol (meta)acrylic amide and the like;
vinyl esters such as vinyl acetate, propionate vinyl and the like;
vinyl ethers such as methyl vinyl ether, ethyl vinyl ether and the like;
alpha-olefins such as ethylene, propylene and the like;
halogenated alpha-beta-unsaturated monomers such as vinyl chloride, vinylidene chloride, fluorinated vinyl and the like;
alpha-beta-unsaturated aromatic monomers such as styrene, alpha-methyl styrene and the like; etc. The monomer may be used alone, or two or more may be used in an appropriate combination.

The oxazoline group-containing polymer may be prepared by polymerization of addition-polymerizable oxazoline and optional at least one other polymerizable monomer, in a conventionally known polymerization method such as a suspension polymerization, a solution polymerization, an emulsification polymerization and the like. A supply form of an oxazoline group-containing compound may include a solution of organic solvent, a solution of aqueous solvent, non-aqua dispersion, emulsion and the like, and is not limited in the above form.

The carbodiimide includes any carbodiimide compound prepared by any conventional method, such as a carbodiimide generally prepared by a condensation reaction wherein an organic diisocyanate is subjected to a decarboxylation at the isocyanate terminals to produce a polycarbodiimide compound.

In a preferable embodiment, the preparation of the polycarbodiimide compound includes steps of:
reacting a polycarbodiimide compound having at least two isocyanate groups in one molecule with a polyol wherein a hydroxyl group presets at the terminal to give a reaction product, wherein molar ratio of the total isocyanate groups of the polycarbodiimide compound to the total hydroxyl groups of the polyol is more than 1; and reacting the reaction product with a hydrophilicizing agent having an active hydrogen and a hydrophilic moiety to produce a hydrophilicized carbodiimide compound. Such hydrophilicized carbodiimide compound is preferably used in the present invention.

The polycarbodiimide compound having at least two isocyanate groups in one molecule includes, but is not particularly limited to, preferably, a carbodiimide compound having an isocyanate group at one terminal and another isocyanate group on the other terminal, which has an excellent reactivity. The carbodiimide compound having at least two isocyanate groups on the both terminals can be prepared by a method known to those skilled in the art, for example, which includes a condensation wherein an organic diisocyanate is subjected to a decarboxylation.

Hydrophilic Associated Type Viscosity Agent

A hydrophilic associated type viscosity agent is a viscosity agent having a hydrogen bond between the viscosity agents or between the viscosity agent and a film forming resin, and exerts binding strength (interaction) therefrom. The hydrophilic associated type viscosity agent may include, for example, polyamide type viscosity agent, and a commercially available viscosity agents such as BYK-430 and BYK-431 (product names, all products are manufactured by BYK-Chemie company), Disparlon AQ-580, Disparlon AQ-600, Disparion AQ-607 (product names, all products are manufactured by Kusumoto Chemincals, Ltd.), Thixol W-300, Thixol W-400LP (product names, all products are manufactured by Kyoeisha Chemical Co., Ltd.), and the like.

The first water-based base coating composition may contain another viscosity agent(s) other than the hydrophilic associated type viscosity agent.

Another viscosity agent(s) may include a hydrophobic associate type viscosity agent which exerts viscosity derived from interaction of hydrophobic groups (hydrophobic parts) in the molecular, an alkali thickened type viscosity agent, and the like.

The hydrophobic associate type viscosity agent may include, for example, polyvinyl alcohol and polyethylene oxide, and a commercially available product (shown in a product name) such as Adeka nol UH-420, Adeka nol UH-462, Adeka nol UH-472, UH-540, Adeka nol UH-814N (all products are manufactured by Adeka corporation), Primal RH-1020 (manufactured by Rohm and Haas company), Kuraray Poval (manufactured by Kuraray co., ltd.) and the like.

The alkali thickened type viscosity agent may include, for example, a cellulose type such as viscose, methyl cellulose, ethyl cellupose, hydroxyethyl cellulose, and a commercially available product (shown in a product name) such as Tylose MH and Tylose H (all products are manufactured by Hoechst ltd.);

sodium polyacrylate, polyvinyl alcohol, carboxymethyl cellulose, a commercially available product (shown in a product name) such as Primal ASE-60, Primal TT-615, Primal RM-5 (all products are manufactured by Rohm and Haas company), UCAR Polyphobe (manufactured by Union Carbide Corporation) and the like.

A content of the hydrophilic associated type viscosity agent and another viscosity agent(s) in the first water-based base coating composition may preferably be 0.01 to 20 mass % based on a resin solid of the first water-based base coating composition (a resin solid content of all the resin components in the first water-based base coating composition), more preferably 0.1 to 10 mass %. When the content is less than 0.01 mass %, viscosity control effects may be deteriorated and sagging at coating may occur. When the content is more than 20 mass %, film appearance and coating film performance of the resulting coating film may be deteriorated.

A solid content ratio of the hydrophilic associated type viscosity agent and another viscosity agent(s) in the first water-based base coating composition may preferably be 100/0 to 50/50 in a ratio of the hydrophilic associated type viscosity agent/another viscosity agent(s), more preferably 100/0 to 80/20. When a ratio of another viscosity agent(s) is more than 50/50, sagging at coating and deterioration of finished appearance of the resulting multilayer coating film may occur.

The first water-based base coating composition used in the present invention may contain an additional resin component, a pigment-dispersing paste, and another additives in addition to the acrylic emulsion resin, the curing agent and the hydrophilic associated type viscosity agent.

The additional resin component is not limited and may include, for example, a polyester resin, an acrylic resin, a carbonate resin, an epoxy resin and the like.

The pigment-dispersing paste may be prepared by pre-dispersing a pigment and a pigment-dispersing agent in a small amount of an aqueous medium. The pigment-dispersing agent is a resin having a structure with a pigment-affinity part and a hydrophilic part. The pigment-affinity part and a hydrophilic part include, for example, a functional group such as nonionic, cationic or anionic groups. The pigment-dispersing agent may have two or more kinds of the functional group.

The nonionic functional group may include, for example, a hydroxyl group, an amido group, a polyoxyalkylene group and the like. The cationic functional group may include, for example, an amino group, an imino group, a hydrazino group and the like. In addition, the anionic functional group may include a carboxyl group, a sulfone acid group, a phosphate group and the like. The above pigment-dispersing agent may be prepared by a conventional method known in the art.

The pigment-dispersing agent may preferably be an agent which can disperse a pigment efficiently in a small amount. An example of the pigment-dispersing agent may be a commercially available agent (the following products are shown in a trade name), and may include, for example, an anion-nonion type dispersing agent such as Disperbyk 190, Disperbyk 181, Disperbyk 182, Disperbyk 184 (all products are manufactured by BYK-Chemie company), EFKAPOLY-MER 4550 (manufactured by EFKA company); a nonionic dispersing agent such as Solsperse 27000 (manufactured by Avecia Inc.); an anionic dispersing agent such as Solsperse 41000, Solsperse 53095 (all products are manufactured by Avecia Inc.) and the like.

A number average molecular weight of the pigment-dispersing agent may preferably be in a range of 1,000 to 100,000, more preferably 2,000 to 50,000, most preferably 4,000 to 50,000. When a number average molecular weight is less than 1,000, dispersion stability may be insufficient. When a number average molecular weight is more than 100,000, handling property may be deteriorated due to excessive viscosity.

The above pigment-dispersing paste may be prepared by mixing and dispersing a pigment and the pigment-dispersing agent in a known method in the art. A content ratio of the pigment-dispersing agent in a preparation of a pigment-dispersing paste may preferably be within a range of 1 to 20 mass % based on a solid content of the pigment-dispersing paste. When a content ratio of the pigment-dispersing agent is less than 1 mass %, dispersion stability of a pigment may deteriorate. When a content ratio of the pigment-dispersing agent is more than 20 mass %, coating film performance of the resulting coating film may be deteriorated. A content ratio may more preferably be within a range of 5 to 15 mass %.

A pigment is not limited as long as the pigment is a pigment used in a conventional aqueous coating composition. The pigment may preferably be a coloring pigment in view of improvement of weather resistance and procurance of hiding property. A preferable example of the pigment may be titanium dioxide in view of excellent hiding property of color and inexpensiveness.

An example of the pigment other than titanium dioxide includes, for example, an organic coloring pigment such as an azo chelate-based coloring pigment, an insoluble azo type coloring pigment, a condensed azo type coloring pigment, a phthalocyanine-based coloring pigment, an indigo coloring pigment, a perinone type coloring pigment, a perylene type coloring pigment, a dioxane type coloring pigment, a quinacridone type coloring pigment, an isoindolinone type coloring pigment, a diketo-pyrrolo-pyrrole type coloring pigment, a benz-imidazolone type coloring pigment, a metal complex coloring pigment and the like; and an inorganic colored pigment such as chrome yellow, yellow iron oxide, red ocher, carbon black and the like. The pigment may include an extender pigment such as calcium carbonate, barium sulfate, clay, talc and the like, in addition to the above pigment.

A content mass ratio of the pigment based on a total mass of a resin solid content and the pigment in the first water-based base coating composition (PWC, pigment weight content) may preferably be within a range of 10 to 60 mass % When the content mass ratio is less than 10 mass %, hiding property may be lowered. When the content mass ratio is more than 60 mass %, film appearance of the coating film may be deteriorated because of viscosity increasing at a curing stage and lowing of flowability.

An example of the additives may be a conventional additive other than the above components, such as an ultraviolet rays absorbent, an antioxidant, an antifoaming agent, a surface regulator, a pinhole inhibitor and the like. A content of the additives may be within a conventional content in the art.

The first water-based base coating composition is prepared by mixing the acrylic emulsion resin, the curing agent and the hydrophilic associated type viscosity agent, and an optional another components.

Contents of the acrylic emulsion resin, the curing agent and the hydrophilic associated type viscosity agent shown in a mass ratio of a resin solid content may preferably be to 60 mass % of the acrylic emulsion resin, more preferably 10 to 50 mass %, 5 to 80 mass % of the curing agent, more preferably 10 to 70 mass %, and 0.01 to 20 mass % of the hydrophilic associated type viscosity agent, more preferably 0.1 to 10 mass %.

When a content of the acrylic emulsion resin is more than 60 mass %, film appearance of resulting coating film may be deteriorated. When a content of the acrylic emulsion resin is less than 1 mass %, workability at coating may be lowered. When a content of the curing agent is more than 80 mass %, chipping property of resulting coating film may be deteriorated. When a content of the curing agent is less than 5 mass %, water resistance of resulting coating film may be lowered. When a content of the hydrophilic associated type viscosity agent is more than 20 mass %, film appearance or water resistance of resulting coating may be lowered. When a content of the hydrophilic associated type viscosity agent is less than 0.01 mass %, sagging or mixing layer may occur in a coating stage of the second water-based base coating composition.

The additional resin component, the pigment-dispersing paste and another additives which are optionally used may be used in proper contents. A content of the additional resin component may preferably be less than 50 mass % based on a resin solid content contained in the first water-based base coating composition. When a content of the additional resin component is more than 50 mass %, making high solid in the coating composition becomes difficult and is not preferable.

An order for adding the components is not limited. A form of the first water-based base coating composition is not particularly limited, as long as the coating composition is an aqueous coating composition, and includes, for example, a water-soluble form, a water-dispersion form, an emulsion form and the like.

Second Water-Based Base Coating Composition

A second water-based base coating composition used in a method for forming a multilayer coating film according to the present invention may be a second water-based base coating composition conventionally used in a coating of automobile body. The second water-based coating composition may contain, for example, a film forming resin, a curing agent, a pigment such as a luster pigment, a coloring pigment, an extender pigment and the like, and additives whish are solved or dispersed in an aqueous medium. The film forming resin includes an acrylic emulsion resin (A), a water soluble acrylic resin (B) and a water soluble polyester resin (C).

Acrylic Emulsion Resin (A)

As the acrylic emulsion resin (A), the acrylic emulsion described in the section of the first water-based base coating composition may be used. The acrylic emulsion resin (A) may preferably contain a single layered acrylic emulsion resin (a) and a core-shell type acrylic emulsion resin (b). In the second water-based base coating composition, the single layered acrylic emulsion resin (a) has lower water retention capacity compared with the core-shell type acrylic emulsion resin (b). In case that a content of the single layered acrylic emulsion resin (a) is too high, sagging or mixing layer in the first water-based base coating film may occur which is caused by increase of move of water toward the first water-based base coating film. In case that a content of the core-shell type acrylic emulsion resin (b) is too high, smoothness of a coating film may be lowered due to excess increase of coating film viscosity of the second water-based base coating composition. A content ratio of the single layered acrylic emulsion resin (a) and the core-shell type acrylic emulsion resin (b) is important in view of a balance between water retention capacity and smoothness of coating film. A content mass ratio of the single layered acrylic emulsion resin (a) in a resin solid content based on the acrylic emulsion resin (A) in a resin solid content, which is shown in (a)/(A), may preferably be within a range of 30 to 60% (expressed in percentage).

Water Soluble Acrylic Resin (B)

A water soluble acrylic resin (B) may be prepared by co-polymerization of a hydroxyl group-containing monomer and another monomer.

The hydroxyl group-containing monomer may include, for example, a hydroxyl group-containing (meta)acrylate such as 2-hydroxyethyl (meta)acrylate, hydroxypropyl (meta)acrylate, 2,3-dihydroxybutyl (meta)acrylate, 4-hydroxybutyl (meta)acrylate; a reactant of the hydroxyl group-containing (meta)acrylate and epsilon-caprolactone; an esterified compound of polyalcohol such as polyethyleneglycol mono(meta)acrylate with acrylic acid or methacrylic acid; and the like. A reactant obtained by ring-opening polymerization of epsilon-caprolactone and an esterified compound which is obtained by esterification of polyalcohol with acrylic acid or methacrylic acid may be used. The hydroxyl group-containing monomer (a) may be a singular compound or in an appropriate combination of two or more compounds. In this specification, the term "(meta)acrylate" means acrylate or methacrylate.

Another monomer may include, for example, a carboxyl group-containing monomer such as acrylic acid, methacrylic acid, crotonic acid, maleic acid, itaconic acid, fumaric acid and the like;
a dicarboxylic acid monoester monomer such as ethyl maleate, butyl maleate, itaconic acid ethyl ester, itaconic acid butyl ester and the like;
a (meth)acrylate alkylester monomer such as methyl (meta) acrylate, ethyl (meta)acrylate, propyl (meta)acrylate, n, i or t-butyl (meta)acrylate, 2-ethylhexyl (meta)acrylate, lauryl (meta)acrylate and the like;
an alicyclic group-containing monomer such as (meta) acrylic acid cyclopentyl, (meta)acrylic acid cyclohexyl, isobornyl (meta)acrylate, tricyclodecanyl (meta)acrylate, adamantyl (meta)acrylate and the like;
a (meth)acrylic acid aminoalkyl ester monomer such as (meta)acrylic acid aminoethyl, (meta)acrylic acid dimethyl aminoethyl, (meta)acrylic acid butyl aminoethyl and the like;
a (meth)acrylic acid aminoalkyl amide monomer such as aminoethyl (meth)acrylamaide, dimethylaminomethyl (meth)acrylamaide, methylaminopropyl (meth)acrylamaide;
another amido group-containing monomer such as acrylic amide, methacrylamide, N-methylol acrylic amide, methoxybutyl acrylic amide, diacetone acrylic amide and the like;
a vinyl cyanide monomer such as (meth)acrylonitrile, alpha-chloro acrylonitrile and the like;
a saturated aliphatic carboxylic acid vinyl ester monomer such as vinyl acetate, vinyl propionate and the like;
a styrene monomer such as styrene, alpha-methyl styrene, vinyl toluene; and the like.
These monomers may be a singular compound or in an appropriate combination of two or more compounds.

In these another monomers, acrylic acid, methacrylic acid, methyl (meta)acrylate, ethyl (meta) acrylate, 2-ethylhexyl (meta) acrylate, lauryl(meta) acrylate, (meta)acrylic acid cyclohexyl and the like may preferably be used.

As a polymerization process of the hydroxy group-containing monomer and another monomer, a conventional process which is used in the art may be used. A polymerization process may include, for example, a bulk polymerization process, a solution polymerization process, a bulk-suspension two-step polymerization process including a suspension polymerization after a bulk polymerization and the like. In these polymerization processes, a solution polymerization process may preferably be used. The solution polymerization process may be, for example, a process of heating of the monomer mixture at a temperature of 80° C. to 200° C. with stirring in the presence of a radical polymerization initiator.

The water soluble acrylic resin (B) may preferably have a number average molecular weight within a range of 1,000 to 15,000, more preferably 1,000 to 8,000, most preferably 1,000 to 5,000. When a number average molecular weight is less than 1,000, coating film property of a resulting multilayer coating film may be deteriorated. On the other hand, when a number average molecular weight is more than 15,000, excess amount of solvent may be required in a preparation of a coating composition because of high viscosity of a resin component.

The water soluble acrylic resin (B) may preferably have a hydroxyl value of a solid content within a range of 50 to 250 mgKOH/g, more preferably 60 to 200 mgKOH/g, most preferably 80 to 180 mgKOH/g. When a hydroxyl value of a solid content is less than 50 mgKOH/g, coating film property of a resulting multilayer coating film may be deteriorated because of poor reactivity toward the curing agent. In addition, adhesion of coating film may be deteriorated. On the other hand, when a hydroxyl value of a solid content is more than 250 mgKOH/g, water resistance of a resulting multilayer coating film may be deteriorated.

The water soluble acrylic resin (B) may preferably have an acid value of a solid content within a range of 2 to 50 mgKOH/g, more preferably 5 to 20 mgKOH/g. When an acid value of a solid content is less than 2 mgKOH/g, coating film property of a resulting multilayer coating film may be deteriorated. On the other hand, when an acid value of a solid content is more than 50 mgKOH/g, water resistance of a resulting multilayer coating film may be deteriorated.

The water soluble acrylic resin (B) may be a commercially-available products. A concrete example of a commercially-available water soluble acrylic resin (B) may be, for example, Acrydic series (trade name) produced by DIC Corporation, such as Acrydic A-837, Acrydic A-871, Acrydic A-1370 and the like; Hariacron series (trade name) produced by Harima Chemicals Co., Ltd., such as Hariacron D-1703, Hariacron N-2043-60MEX and the like; Dianal series (trade name) produced by Mitsubishi Rayon Co., Ltd.; Hitaloid series (trade name) produced by Hitachi Chemical Co., Ltd.; Olester series (trade name) produced by Mitsubishi. Chemical Corporation; and the like.

Water Soluble Polyester Resin (C)

The second water-based base coating composition according to the present invention contains a water soluble polyester resin (C). The water soluble polyester resin (C) contained in the second water-based base coating composition can provide advantages such as improvement of coating workability and improvement of coating film appearance of a resulting coating film. As the water soluble polyester resin (C) contained in the second water-based base coating composition, a compound having two hydroxyl groups in one molecular, which is generally called a polyester polyol, may be preferably used. The water soluble polyester resin may be prepared by polycondensation reaction (esterification reaction) of polyalcohol with polybasic acid or anhydride thereof.

The polyalcohol may include, for example, ethylene glycol, diethylene glycol, polyethylene glycol, propylene glycol, dipropylene glycol, polypropylene glycol, neopentylglycol, 1,2-butanediol, 1,3-butanediol, 2,3-butanediol, 1,4-butanediol, 1,5-pentanediol, 1,6-hexanediol, hydrogenated bisphenol A, hydroxyalkylated bisphenol A, 1,4-cyclohexanedimethanol, 2,2-dimethyl-3-hydroxypropyl-2,2-dimethyl-3-hydroxypropionate, 2,2,4-trimethyl-1,3-pentanediol, N,N-bis-(2-hydroxyethyl) dimethyl hydantoin, polytetramethylene ether glycol, polycaprolactone polyol, glycerin, sorbitol, trimethylol ethane, trimethylol propane, trimethylol butane, hexanetriol, pentaerythritol, dipentaerythritol, tris-(hydroxyethyl) isocyanate and the like. These polyalcohols may be a singular compound or in an appropriate combination of two or more compounds.

The polybasic acid or anhydride thereof may include, for example, phthalic acid, phthalic anhydrite, tetrahydrophthalic acid, tetrahydrophthalic anhydrite, hexahydrophthalic acid, hexahydrophthalic anhydrite, methyl tetrahydrophthalic acid, methyl tetrahydrophthalic anhydrite, himic anhydride, trimellitic acid, trimellitic anhydride, pyromellitic acid, pyromellitic anhydride, isophthalic acid, terephthalic acid, maleic acid, maleic anhydride, fumaric acid, itaconic acid, adipic acid, azelaic acid, sebacic acid, succinic acid, succinic anhydride, lactic acid, dodecenyl succinic acid, dodecenyl succinic anhydride, cyclohexane-1,4-dicarboxylic acid, endo anhydride and the like. These polybasic acids or anhydrides thereof may be a singular compound or in an appropriate combination of two or more compounds.

A water soluble polyester resin obtained by modification in use of a compound such as lactone, oils or fatty acid, melamine resins, urethane resins and the like may be used as the water soluble polyester resin (C). An example of a water soluble polyester resin obtained by modification in use of oils or fatty acid may include a modified polyester resin obtained by modification in use of oils such as castor oil, dehydration castor oil, coconut oil, corn oil, cottonseed oil, linseed oil, penile oil, poppy oil, safflower oil, bean oil, tung oil, or fatty acids obtained by extraction thereof. In a preparation of the modified polyester resin in use of oils or fatty acids, a total amount of the oils or fatty acids for incorporation may preferably be up to about 30 mass parts based on 100 mass parts of polyester resin.

The water soluble polyester resin (C) may preferably have a number average molecular weight of 500 to 6,000 in polystyrene conversion measured by gel permeation chromatography (CPC), more preferably 1,000 to 4,000. When a number average molecular weight is less than 500, adhesion of coating film of a resulting coating film may be deteriorated. When a number average molecular weight more than 6,000, coating concordance toward a coating substrate in coating step may be deteriorated.

The water soluble polyester resin (C) may preferably have a solid hydroxyl value of 80 to 350 mgKOH/g, more preferably 80 to 300 mgKOH/g, most preferably 150 to 250 mgKOH/g. When a solid hydroxyl value is less than 80 mgKOH/g, coating film property of a resulting multilayer coating film may be lower because of decrease of reactivity with a curing agent. In addition, adhesion of coating film of a resulting coating film may be deteriorated. When a solid hydroxyl value is more than 350 mgKOH/g, water resistance of a resulting multilayer coating film may lower.

In the second water-based base coating composition according to the present invention, it is required that a rate represented by the following formula:

$(A)/(A+B+C)$ wherein (A) is a resin solid content by mass of the acrylic emulsion resin (A), and (A+B+C) is a total resin solid content by mass of the acrylic emulsion resin (A), the water soluble acrylic resin (B) and the water soluble polyester resin (C), is from 40% to 60% expressed in percentage.

An acrylic emulsion resin generally has higher molecular weight, and tends to provide abrupt coagulation in case of high amounts of resin solids. Therefore, an acrylic emulsion has higher property of water exclusion, compared with a water soluble resin. Then, design of increasing an amount of a water soluble resin in the second water-based base coating composition (that is, reducing an amount of the acrylic emulsion resin (A)) can increase water-retaining capacity of a second water-based base coating composition, at the same time, can prevent mobilization of water into a first water-based base coating film (a lower layer) in a coating step. On the other hand, reducing an amount of the acrylic emulsion resin (A) may deteriorate design properties because of lower viscosity of uncured coating film (for example, orientation of aluminum pigments in a second water-based base coating film). Thus, it is important to design an amount ratio of the acrylic emulsion resin (A) and a water soluble resin, i.e., the water soluble acrylic resin (B) and the water soluble polyester resin (C), in order to keep the above functions in excellent states.

The present invention defines that a rate represented by the following formula:

$(A)/(A+B+C)$ wherein (A) is a resin solid content by mass of the acrylic emulsion resin (A), and (A+B+C) is a total resin solid content by mass of the acrylic emulsion resin (A), the water soluble acrylic resin (B) and the water soluble polyester resin (C), is from 40% to 60% expressed in percentage.

The rate expressed in percentage may preferably be from 50% to 60%, more preferably from 55% to 60%. When the ratio is less than 40%, a viscosity of the second water-based base coating film is lower and design property of coating film (orientation of aluminum pigments) deteriorates. When the ratio is more than 60%, water-retaining capacity of a second water-based base coating composition becomes lower, and coating defect such as sagging or mixing of layers occurs due to transfer of water toward the first water-based base coating film at the time of coating of the second water-based base coating composition.

Pigments

The second water-based base coating composition may preferably contain a pigment. As the pigment, a conventional pigment which is generally used in a coating field can be used. The pigment may include, for example, the pigment described in the first water-based base coating composition, in addition, uncolored or colored metal luster material of metal such as aluminum, copper, zinc, iron, nickel, tin, aluminum oxide and the like, an alloy thereof, and mixtures thereof; and a luster pigment such as an interference mica pigment, a white mica pigment, a graphite pigment and the like. The pigment may be used alone, or two or more pigments may be used in an appropriate combination.

A content mass ratio of the pigment based on a total mass of a resin solid content and the pigment in the second water-based base coating composition (PWC, pigment weight content) may generally be within a range of 0.1 to 50 mass %, preferably within a range of 0.5 to 40 mass %, more preferably within a range of 1 to 30 mass % When a pigment weight content is less than 0.1 mass %, an technical effects caused by a pigment may not be obtained. When a pigment weight content is more than 50 mass %, film appearance of resulting coating film may be deteriorated.

The second water-based base coating composition according to the present invention may optionally contain additives in addition to the above components. An example of the additives may be, for example, an organic solvent, a curing catalyst (an organic metal catalyst), a sagging-preventing/sedimentation-preventing agent, a surface conditioner, a color separation-preventing agent, a dispersing agent, an antifoaming/forming-preventing agent, a viscosity-adjusting agent (an thickener), a leveling agent, a matting agent, an ultraviolet rays absorbent, an antioxidant, a plasticizer, a film-forming assistant and the like.

The organic solvent may include, for example, methyl ethyl ketone, methyl isobutyl ketone, cyclohexanone, Solvesso 100, Solvesso 150, Solvesso 200 (all products are produced by Exxon Chemistry Corporation), toluene, xylene, methoxybutyl acetate, cellosolve acetate, butyl cellosolve acetate, methyl acetate, ethyl acetate, butyl acetate, petroleum ether, petroleum naphtha and the like.

An amount of the organic solvent is not limited. However, it may be preferred that an amount of the organic solvent is an amount with an environmental protection and an environmental influence taken into consideration.

As the sagging-preventing/sedimentation-preventing agent, for example, Disparlon 6700 (a product name, fatty acid bisamide-based thixotropic agent, produced by Kusumoto Chemicals, Ltd.) and the like may preferably be used. As the color separation-preventing agent, for example, Disparlon 2100 (a product name, silicone-added aliphatic polycarboxylic acid, produced by Kusumoto Chemicals, Ltd.) and the like may preferably be used. As the antifoaming/forming-preventing agent, for example, Disparlon 1950 (a product name, a specific vinyl polymer, produced by Kusumoto Chemicals, Ltd.) and the like may preferably be used.

The surface conditioner may preferably include, for example, polyether-modified siloxane, polyester-modified polymethylalkyl siloxane, polyether-modified polydimethyl siloxane, acrylic group-containing polyether-modified polydimethyl siloxane and the like. Using such surface conditioner can provide a surface tension of the coating composition within a suitable range.

The second water-based base coating composition can be prepared in a same manner as the preparation method of the first water-based base coating composition. A type of the second water-based base coating composition is not particularly limited, as long as the coating composition is an aqueous coating composition, and includes, for example, a water-soluble form, a water-dispersion form, an emulsion form and the like.

Clear Coating Composition

A clear coating composition used in a method for forming a multilayer coating film according to the present invention may be a usual clear coating composition for coating of an automobile body. The clear coating composition may be, for example, a clear coating composition containing a film-forming resin and an optional curing agent and additives in a form of dispersed or dissolved in medium. The film-forming resin may include, for example, an acrylic resin, a polyester resin, an epoxy resin, an urethane resin and the like. These resins may be used in a combination of a curing agent such as an amino resin, an isocyanate resin and mixtures thereof. From the viewpoint of the transparency, acid etch resistance or the like, the combination of the acrylic resin and/or polyester resin with an amino resin, or the acrylic resin and/or polyester resin having carboxylic acid-epoxy curing system and the like may be preferred.

The clear coating composition may be of any coating type, such as any of an organic solvent-based coating composition, an aqueous (water-soluble, water-dispersible, or emulsion) coating composition, a non-water-dispersible coating composition and a powdered coating composition. The clear coating composition may further contain additives such as a curing catalyst, a surface conditioner, a viscosity modifier, an ultraviolet-rays absorbent, a light stabilizer and the like.

Method for Forming a Multilayer Coating Film

A method for forming a multilayer coating film according to the present invention is a method including the steps of;

(1) applying a first water-based base coating composition on a surface of a coating material to form an uncured first water-based base coating film, (2) applying a second water-based base coating composition on the uncured first water-based base coating film to form an uncured second water-based base coating film, (3) applying a clear coating composition on the uncured second water-based base coating film to form an uncured clear coating film, and (4) simultaneously heating and curing the uncured first water-based base coating film, the uncured second water-based base coating film and the uncured clear coating film formed in the steps (1), (2) and (3) to form a multilayer coating film.

A coating material used in the method for forming a multilayer coating film according to the present invention is not particularly limited and may include, for example, iron, copper, aluminum, tin, zinc, an alloy thereof and the like, as well as a plated product and a vapor deposited product in use of the metal described above. The coating material may have a cured electrodeposition coating film on its surface. The cured electrodeposition coating film is obtained by applying an electrodeposition coating composition on a coating material and curing by heating.

The electrodeposition coating composition is not particularly limited, and a conventional cationic electrodeposition coating composition or a conventional anionic electrodeposition coating composition may be used as the electrodeposition coating composition. Methods and conditions of applying an electrodeposition coating composition and curing by heating may be a conventional method and condition in electrodeposition coating of an automobile body.

First, the first water-based base coating composition is applied on a surface of the coating material to form an uncured first water-based base coating film. For example, the first water-based base coating composition can be applied by spraying with an air electrostatic spray coater, which is so-called "react gun"; a rotary spray electrostatic coater, which is so-called "micro micro (μμ) bell", "micro (μ) bell" or "metallic (meta) bell"; or the like.

A coating amount of the first water-based base coating composition is adjusted such that the resulting first base coating film has a cured coating film thickness of 5 to 40 μm, preferably 10 to 30 μm. When the film thickness is less than 5 μm, film appearance and chipping resistance of the resulting coating film may be lowered. On the other hand, when the film thickness is more than 40 μm, problems such as the sagging of the coating composition during the application thereof and an occurrence of pinholes when heating and curing the coating composition may occur.

In the method for forming a multilayer coating film according to the present invention, the second water-based base coating composition is applied on the obtained uncured first water-based base coating film to form an uncured second water-based base coating film, without heating and curing the first water-based base coating film in the coating of the first water-based base coating composition. In the method for forming a multilayer coating film according to the present invention, it is advantageous that wet-on-wet coating without preheat in coating the second water-based base coating composition on the uncured first water-based base coating film can be performed.

In a conventional wet-on-wet coating, a preheat step of an uncured first water-based base coating film before coating a second water-based base coating composition is generally performed. The reason why such preheat step is performed is to prevent the following defects:

pin hole caused by bumping of residual water contained in an uncured first water-based base coating film in curing and heating a multilayer coating film may frequently occur, and mixing layer caused by mixing of an uncured first water-based base coating film and an uncured second water-based base coating film may occur in coating a second water-based base coating composition to lower film appearance of a multilayer coating film. Such preheat step includes, for example, a drying at a temperature of about 80° C. for one to 10 minutes.

In the present invention, specifying components contained in the first water-based base coating composition and the second water-based base coating composition can provide an advantageous effect of wet-on-wet coating without preheat in coating the second water-based base coating composition on the uncured first water-based base coating film. The term "without preheat" in this specification means, for example, applying the first water-based base coating composition at a room temperature (for example, 10 to 30° C.), then applying the second water-based base coating composition in 0 to 30 minutes after coating of the first water-based base coating composition. Such advantageous effect in the present invention seems to be caused by prevention of water-transfer contained in the second water-based base coating composition toward the uncured first water-based base coating film in coating the second water-based base coating composition on the uncured first water-based base coating film, and prevention of sagging and mixing layer caused by adjustment of viscosity of the uncured water-based base coating film resulting from the hydrophilic associated type viscosity agent.

The second water-based base coating composition is applied on the uncured first water-based base coating film to form an uncured second water-based base coating film. For example, the second water-based base coating composition can be applied by spraying with an air electrostatic spray coater, which is so-called "react gun"; a rotary spray electrostatic coater, which is so-called "micro micro (μμ) bell", "micro (μ) bell", or "metallic (meta) bell"; or the like.

A coating amount of the second water-based base coating composition is adjusted such that the resulting second base coating film has a cured coating film thickness of 5 to 30 μm. When the film thickness is less than 5 μm, inadequate hiding property or color unevenness appearance may occur. On the other hand, when the film thickness is more than 30 μm, problems such as the sagging of the coating composition during the application thereof and the occurrence of pinholes when heating and curing the coating composition may occur.

A viscosity at a temperature of 20° C. of the uncured first water-based base coating film after applying the second water-based base coating composition may preferably be from 45 to 100 Pa·s at a shear rate of 0.01/s, more preferably from 60 to 90 Pa·s, in view of smoothness of resulting multilayer coating film. The viscosity of the uncured first water-based base coating film can be measured by the followings:

(1) applying the first water-based base coating composition on a surface of cured electrodeposition coating film on a substrate, then having setting at 25° C. for 6 minutes, next, applying the second water-based base coating composition,
(2) after having setting at 25° C. for 3 minutes, putting an aluminum foil on a resulting second water-based base coating film, then, peeling the aluminum foil to remove the attached mere second water-based base coating film,
(3) gathering the remaining first water-based base coating film with a spatula, then measuring a viscosity of the uncured first water-based base coating film with a viscometer (MCR-301) produced by Anton Paar corporation at a shear rate of 0.01/s.

Next, applying the clear coating composition on the uncured second water-based base coating film to form an uncured clear coating film. The clear coating composition can be applied in a coating method corresponding to its type of the clear coating composition. Usually, the coating amount of the clear coating composition is adjusted such that the resulting clear coating film has a dry coating film thickness of 10 to 70 μm. When the film thickness is less than 10 μm, lowering of appearance, such as a gloss of the multilayer coating film may occur. On the other hand, when the film thickness is more than 70 μm, lowering of decorative (sharpness) of the coating film, sagging or unevenness of the coating composition during the application thereof may occur. It may be preferable that applying preheat, for example, at a temperature of 40 to 100° C. for 2 to 10 minutes after forming the uncured second water-based base coating film, in order to obtain more excellent film appearance.

Next, the uncured first water-based base coating film, the uncured second water-based base coating film and the uncured clear coating film are simultaneously heated and cured. The heating may be usually at a temperature of 110 to 180° C., preferably 120 to 160° C. The heating can provide a cured coating film having high degree of cross-linking. When a heating temperature is less than 110° C., inadequate curing may be obtained. When a heating temperature is more than 180° C., a hard and brittle coating film may be obtained. A heating time can be adjusted depending on a heat temperature, and may be, for example, 10 to 60 minutes at a hearing temperature of 120 to 160° C.

The multilayer coating film obtained by the method for forming a multilayer coating film according to the present invention has excellent smoothness and excellent film appearance, even when the second water-based base coating composition is applied wet-on-wet on the uncured first water-based base coating film without preheat after the first water-based base coating composition is applied. The method for forming a multilayer coating film according to the present invention has such advantages. The present invention therefore does not need a preheat step after the first water-based base coating composition is applied, which provides energy saving and reduction of $CO_2$ emissions in coating steps. In addition, the present invention has advantages of facility cost and coating line spaces.

EXAMPLES

The present invention is more concretely illustrated below according to Examples, but the present invention is not limited only to these Examples. In Examples, unless otherwise noted, "parts" and "%" are by mass basis.

Preparation Example 1

Preparation of Acrylic Emulsion Resin

Water (445 parts) and 5 parts of Newcol 293 (an emulsifier manufactured by Nippon Nyukazai Co., Ltd.) were charged to a reaction vessel conventionally used for preparing acrylic resin emulsion with a stirrer, a thermometer, a dropping funnel, a reflux condenser and a nitrogen inlet tube, and the temperature was raised to 75° C. with stirring.

The mixture of monomer mixture of 145 parts of methyl methacrylate, 50 parts of styrene, 220 parts of ethyl acrylate, 70 parts of 2-hydroxyethyl methacrylate and 15 parts of methacrylic acid; and 240 parts of water and 30 parts of Newcol 293 (manufactured by Nippon Nyukazai Co., Ltd.); was emulsified with a homogenizer to form a monomer pre-emulsion. The monomer pre-emulsion was dropped to the reaction vessel for 3 hours with stirring. In parallel with the dropping of the monomer pre-emulsion, an aqueous solution prepared by dissolving 1 part of ammonium persulfate as a polymerization initiator in 50 parts of water was evenly dropped to the reaction vessel until the dropping of the monomer pre-emulsion was completed. After the completion of the dropping of the monomer pre-emulsion, the reaction was further continued for 1 hour at 80° C., and then cooled. After cooling, an aqueous solution prepared by dissolving 2 parts of dimethylamino ethanol in 20 parts of water was poured in the reaction vessel to obtain an acrylic emulsion resin having a solid component of 40.6% by mass.

The resulting acrylic emulsion resin had a solid acid value of 20 mgKOH/g, a solid hydroxyl value of 60 mgKOH/g and Tg of 30° C. The solid content was determined according to JIS K 5601-1-2, Determination of non-volatile matter content.

Preparation Example 2

Preparation of Pigment Dispersed Paste

Disperbyk 190 (4.5 parts, a nonion-anion-type dispersant, produced by BYK-Chemie company) as a dispersant, 0.5 part of BYK-011 (an antifoaming agent, produced by BYK-Chemie company) as an antifoaming agent, 22.9 parts of deionized water and 72.1 parts of titanium dioxide were pre-mixed, then mediums of glass beads were added into the resulting mixture contained in a paint conditioner and mixed and dispersed at room temperature until a grain size was not more than 5 μm, to obtain a pigment dispersed paste.

Preparation Example 3

Preparation of Polyester Resin Water Dispersion

In a reaction vessel conventionally used for preparing polyester resin with a stirrer, a thermometer, a reflux condenser and a nitrogen inlet tube, 19 parts of isophthalic acid, 36 parts of hexahydrophthalic anhydride, 7 parts of trimethylolpropane, 12 parts of neopentyl glycol, 26 parts of 1,6-hexanediol and 0.1 part of dibutyltin oxide as a catalyst were charged, and the temperature was raised from 150° C. to 230° C. for three hours and kept at a temperature of 230° C. for 5 hours.

After cooling at a temperature of 135° C., 7.7 parts of trimellitic anhydride was added and mixed for one hour to obtain a polyester resin having a solid acid value of 50 mgKOH/g, a solid hydroxyl value of 45 mgKOH/g and a number-average molecular weight of 2500. The reaction mixture was cooled to 90° C., and 7.3 parts of dimethyl ethanolamine and 225 parts of deionized water were added thereto, to obtain a polyester resin water dispersion having a solid component concentration of 30%.

Preparation Example 4

Preparation of First Water-Based Base Coating Composition (1)

After mixing 206.6 parts of the pigment dispersed paste obtained by Preparation example 2, 45.0 parts of the acrylic emulsion resin obtained by Preparation example 1, 62.4 parts of the polyester resin water dispersion obtained by Preparation example 3 and 78.7 parts of Cymel 211 (a melamine resin produced by Nihon Cytec Industries Co., Ltd., a nonvolatile content of 80%) as a curing agent were mixed, and 6.7 parts of BYK-430 (a hydrophilic associated type viscosity agent (a nonvolatile content of 30%), produced by BYK-Chemie company, the amounts corresponds to 2 mass % based on a resin solid content of a first water-based base coating composition) as a viscosity agent was added thereto and mixed, to obtain a first water-based base coating composition (1).

Preparation Example 5

Preparation of First Water-Based Base Coating Compositions (2)-(9)

Water-based base coating compositions (2)-(9) were prepared in the same manner as Preparation example 4, except that a type of a viscosity agent and an amount of a viscosity agent were changed from a hydrophilic associated type viscosity agent BYK-430 used as a viscosity agent, in accordance with Table 1. In the preparation of water-based base coating compositions (7)-(9), a hydrophobic associated type viscosity agent was used in place of a hydrophilic associated type viscosity agent.

TABLE 1

| Type of viscosity agent | First water-based base coating composition | | | | | | | | |
|---|---|---|---|---|---|---|---|---|---|
| | (1) | (2) | (3) | (4) | (5) | (6) | (7) | (8) | (9) |
| BYK-430 *1 | 2 | | | | | | | | |
| AQ-607 *2 | | 2 | 1.6 | 1 | 1 | 1 | | | |
| UH-540 *3 | | | 0.4 | 1 | | | 2 | | |
| RHEOLATE266 *4 | | | | | 1 | | | 2 | |
| BYK-425 *5 | | | | | | 1 | | | 2 |

A numerical value in Table means a mass % based on a resin solid content of a first water-based base coating composition.
*1 A hydrophilic associated type viscosity agent, manufactured by BYK-Chemie company.
*2 A hydrophilic associated type viscosity agent, manufactured by Kusumoto Chemincals, Ltd.
*3 A hydrophobic associated type viscosity agent, manufactured by ADEKA Corporation.
*4 A hydrophobic associated type viscosity agent, manufactured by Elementis plc.
*5 A hydrophobic associated type viscosity agent, manufactured by BYK-Chemie company.

Preparation Example 6

Preparation of Single Layered Acrylic Emulsion Resin (a)

Into a reaction vessel, 126.5 parts of ion-exchanged water was charged and heated at a temperature of 80° C. under nitrogen atmosphere. Next, both of a mixture of a monomer mixture (100 parts) of 27.61 parts of methyl acrylate, 53.04 parts of ethyl acrylate, 4.00 parts of styrene, 9.28 parts of 2-hydroxyethyl methacrylate, 3.07 parts of methacrylic acid and 3.00 parts of allyl methacrylate, and a mixture of 0.7 part of AQUARON HS-10 (polyoxyethylene alkylpropenylphenyl ether sulfate, produced by Dai-ichi Kogyo Seiyaku co., ltd.) and 0.5 part of ADEKA REASOAP NE-20 (alpha-[1-[(allyloxy)methyl]-2-nonylphenoxy]ethyl)-omega-hydroxyoxyethylene, produced by ADEKA CORPORATION) and 80 parts of ion-exchanged water; and an initiator solution of 0.3 part of ammonium persulphate and 10 parts of ion-exchanged water; were simultaneously added dropwise into the reaction vessel over 2 hours respectively. After completion of the dropwise addition, aging was carried out at the same temperature for 2 hours. Next, the reaction mixture was cooled at 40° C. and filtered with a 400 mesh filter. Then 70 parts of ion-exchanged water and 0.32 part of dimethylaminoethanol were added to adjust a pH of 6.5, and a single layered acrylic emulsion resin (a) having an average particle diameter of 150 nm, non-volatilization of 25%, a solid acid value of 20 mgKOH/g and a hydroxyl value of 40 mgKOH/g was obtained.

Preparation Example 7

Preparation of Core-Shell Type Acrylic Emulsion Resin (b)

Into a separable flask (2 L) equipped with a stirrer, a reflux condenser, a dropping funnel, a nitrogen inlet tube and a thermo-sensor, 651 parts of ion-exchanged water was charged and heated at a temperature of 70° C. under nitrogen atmosphere. A pre-prepared pre-emulsion (1) as a first step monomer component of 300 parts of methyl methacrylate, 194 parts of styrene, 6 parts of methacrylic acid (a calculated Tg of core by the three monomers being 104° C.), 33 parts of 15% aqueous solution of polyoxyethylene nonylphenyl ether ammonium sulfate (High tenor N-08, produced by Dai-ichi Kogyo Seiyaku co., ltd.), 40 parts of 25% aqueous solution of polyoxyethylene nonylphenyl ether (Nonipol 200, produced by Sanyo Chemical Industries, ltd.) and 102 parts of ion-exchanged water was added dropwise from the dropping funnel over an hour and a half. At the same time, 30 parts of 5% ammonium persulphate was simultaneously added dropwise into the flask over an hour and a half. After completion of the dropwise addition, aging was carried out for 40 minutes, and a pre-prepared pre-emulsion (2) as a final step monomer component of 116 parts of 2-ethylhexyl acrylate, 206 parts of methyl methacrylate, 150 parts of styrene, 28 parts of acrylic acid (a calculated Tg of shell by the four monomers being 40° C.), 33 parts of 15% aqueous solution of High tenor N-08 (produced by Dai-ichi Kogyo Seiyaku co., ltd.), 40 parts of Nonipol 200 (produced by Sanyo Chemical Industries. ltd., 25% aqueous solution) and 102 parts of ion-exchanged water was added dropwise from the dropping funnel over an hour and a half. At the same time, 30 parts of 5% ammonium persulphate was simultaneously added dropwise into the reaction vessel over an hour and a half. After completion of the dropwise addition, aging was carried out for one hour. Next, the reaction mixture was cooled, and 4.6 parts of 25% aqueous ammonia was added thereto for neutralization, to obtain a core-shell type acrylic emulsion resin (b). The resultant core-shell type acrylic emulsion resin (b) had core Tg of 104° C., shell Tg of 40° C., non-volatilization of 49.2%, pH of 6.0, a viscosity of 550 mPa·s (measured by a B-type viscometer, with a use of a rotor No. 2, 30 rotation per minute, at 25° C., in which the same applies hereafter), a mean particle diameter of 140 nm, which was measured by a dynamic light scattering type particle size measurement device LB-500 (produced by Horiba ltd.) at 20° C.

Preparation Example 8

Preparation of Water-Soluble Acrylic Resin (B)

In a reaction vessel, 23.89 parts of tripropylene glycol methyl ether and 16.11 parts of propylene glycol methyl ether were charged and heated at a temperature of 105° C. with stirring under nitrogen atmosphere. Next, a monomer mixture of 13.1 parts of methyl methacrylate, 68.4 parts of ethyl acrylate, 11.6 parts of 2-hydroxyethyl methacrylate and 6.9 parts of methacrylic acid was prepared. Then 100 parts of resultant monomer mixture and an initiator solution of 10 parts of tripropylene glycol methyl ether and 1 part of t-butyl peroxy 2-ethyl hexanoate were simultaneously added dropwise into the reaction vessel over three hours. After completion of the dropwise addition, aging was carried out at the same temperature for 0.5 hour. Further, an initiator solution of 5 parts of tripropylene glycol methyl ether and 0.3 part of t-butyl peroxy 2-ethyl hexanoate was added dropwise into the reaction vessel over 0.5 hour. After completion of the dropwise addition, aging was carried out at the same temperature for 2 hours. After removal of 16.1 part of a solvent in a solvent removal device under reduced pressure (70 torr) at 110° C., 204 parts of ion-exchanged water and 7.1 parts of dimethyl amino ethanol were added to obtain a water-soluble acrylic resin (B). The resultant water-soluble acrylic resin (B) had non-volatilization of 30%, a solid acid value of 40 mgKOH/g, a hydroxyl value of 50 mgKOH/g, a viscosity of 140 Pa·s (measured by a E-type viscometer, 1 rpm/25° C.).

Preparation Example 9

Preparation of Water-Soluble Polyester Resin (C)

In a reaction vessel equipped with a stirrer, a condenser and a thermometer, 372 parts of dimethyl terephthalate, 380 parts of dimethyl isophthalate, 576 parts of 2-methyl-1,3-propane diol, 222 parts of 1,5-pentanediol and 0.41 part of tetrabutyl titanate were added and heated at a temperature between 160° C. to 230° C. and transesterificated over 4 hours. A pressure of the reaction system was gradually reduced over 20 minutes to reach a reduced pressure of 5 mmHg, further vacuumed to reach a vacuum pressure of not more than 0.3 mmHg, and carried out polycondensation reaction at 260° C. for 40 minutes. The resultant reaction mixture was cooled at 220° C. under a nitrogen atmosphere, and 23 parts of trimellitic anhydride was added thereto and reacted at 220° C. for 30 minutes to obtain a polyester resin. To 100 parts of the resultant polyester resin, 40 parts of butyl cellosolve and 2.7 parts of triethylamine were added, and stirred at 80° C. for one hour to dissolve it. Then, 193 parts of ion-exchanged water was slowly added to obtain a water-soluble polyester resin (C) having non-volatilization of 30%. In order to measure a mean particle diameter, a dedicated cell was charged with ion-exchanged water and one drop of the water-soluble polyester resin (C) was added and mixed to obtain a sample having a resin solid concentration of 0.1 mass %, and a mean particle diameter was measured by a dynamic light scattering type particle size measurement device LB-500 (produced by Horiba ltd.) at 20° C., which was 35 nm.

Preparation Example 10

Preparation of Second Water-Based Base Coating Composition (1)

As the acrylic emulsion resin (A), 50 parts of the single layered acrylic emulsion resin (a) obtained by Preparation example 6 (resin solid content of 25%) and 60 parts of the core-shell type acrylic emulsion resin (b) obtained by Preparation example 7 (resin solid content of 49.2%) were mixed and used. To the resulting mixture, 79 parts of the water-soluble acrylic resin (B) obtained by Preparation example 8

(resin solid content of 30%), 14 parts of the water-soluble polyester resin (C) obtained by Preparation example 9 (resin solid content of 30%), 38 parts of Cymel 204 as the melamine resin (a mixed alkylated-type melamine resin, produced by Mitsui Cytec company, resin solid content of 80%), 10 parts of Prime pole PX-1000 bifunctional polyetter polyol, produced by Sanyo Chemical Industries, ltd.), 21 parts of Alpaste 5H8801 as the luster pigment (an aluminum pigment, produced by Asahi Kasei corporation, solid content of 65%, PWC of 12%), 5 parts of an acrylic resin having phosphate group and 0.3 part of lauryl phosphoric acid were added, then 30 parts of 2-ethyl hexanol and 3.3 parts of Adeka nol UH-814N (a thickener, produced by Adeka corporation, solid content of 30%) were uniformly dispersed to obtain a second water-based base coating composition (1).

Preparation Example 11

Preparation of Second Water-Based Base Coating Compositions (2)-(8)

Second water-based base coating compositions (2)-(8) were prepared in the same manner as Preparation example 10 except that amounts of the acrylic emulsion resin (A), the water soluble acrylic resin (B), the water soluble polyester resin (C) and the other components were changed in accordance with Table 2.

TABLE 2

| | | second water-based base coating composition | | | | | | |
|---|---|---|---|---|---|---|---|---|
| | | (1) | (2) | (3) | (4) | (5) | (6) | (7) | (8) |
| acrylic emulsion resin (A) | single layered acrylic emulsion resin (a) | 18 | 30 | 12 | 20 | 35 | 10 | 21 | 15 |
| | core-shell type acrylic emulsion resin (b) | 42 | 30 | 28 | 20 | 25 | 50 | 49 | 15 |
| water soluble acrylic resin (B) | | 34 | 34 | 50.4 | 40 | 34 | 34 | 24 | 35 |
| water soluble polyester resin (C) | | 6 | 6 | 9.6 | 20 | 6 | 6 | 6 | 35 |
| (A)/(A + B + C) (mass percentages %) | | 60 | 60 | 40 | 40 | 60 | 60 | 70 | 30 |
| (a)/(A) (mass percentages %) | | 30 | 50 | 30 | 50 | 58 | 17 | 30 | 50 |

Example 1

Formation of a Multilayer Coating Film

Powernics 110 (a cationic electrodeposition coating composition produced by Nippon Paint Co., Ltd.) was electrodeposition coated on a dull steel plate treated with zinc phosphate such that the thickness of the dry coating film was 20 μm, and then heat-cured at 160° C. for 30 minutes and cooled to obtain a substrate having cured electrodeposition coating film.

The first water-based base coating composition (1) obtained by Production example 4 was coated on the resulting substrate having cured electrodeposition coating film, by using an air spray coating, such that the film thickness was 20 μm, to form an uncured first water-based base coating film. Without lying in a preheat oven, the second water-based base coating composition (1) obtained by Production example 10 was coated on the resulting substrate, by using an air spray coating, such that the film thickness was 10 μm, followed by preheating at 80° C. for 3 minutes. Next, Macflow O-1800W-2 clear (an acid-epoxy curing type clear coating composition produced by Nippon Paint Co., Ltd.) was coated thereon as a clear coating composition by using an air spray coating such that the thickness of the dry coating film was 35 μm, and then was heated and cured at 140° C. for 30 minutes to obtain a test sample, on which a multilayer coating film was formed.

The above first water-based base coating composition (1), second water-based base coating composition (1) and clear coating composition were diluted described below and used for coating.

The first water-based base coating composition (1) diluent solvent: an ion-exchanged water 40 seconds/No. 4 Ford cup/20° C.

The second water-based base coating composition (2) diluent solvent: an ion-exchanged water 45 seconds/No. 4 Ford cup/20° C.

The clear coating composition diluent solvent: a mixture solvent, EEP (ethylethoxy propionate)/S-150 (aromatic hydrocarbon solvent, produced by Exson corporation)=1/1 (mass ratio) 30 seconds/No. 4 Ford cup/20° C.

The following evaluation tests were performed using the test sample obtained above. Evaluation results were shown in Table 3.

Design Property (Flip-Flop Property)

As for design property (flip-flop property) of the resultant multilayer coating film, L values of 15° (front) and 110° (shade) were measured with X-Rite MA-68II (produced by X-Rite corporation). These values show that the higher the values are, the better the design property are.

Smoothness (SW Values and LW Values)

As for film appearance of the resultant multilayer coating film, LW (wavelength region as a measurement: 1,300 to 12,000 μm) and SW (wavelength region as a measurement: 300 to 1,200 μm) were measured with Wave scan DOI (produced by BYK Gardner corporation) and evaluated. These values show that the smaller the values are, the better the smoothness are.

Sagging Property

Test plates were prepared in the same coating manner described above, except that a substrate having cured electrodeposition coating film and having a hole with a diameter of 5 mm was used as a coating substrate having cured electrodeposition coating film. Sagging lengths at the hole after heat curing were measured. These values show that the smaller the values are, the better the sagging properties are.

Measurement Method of Viscosity (Pa's) of the First Water-Based Base Coating Film after Applying the Second Water-Based Base Coating Composition On a substrate having cured electrodeposition coating film, the first water-based base coating composition was applied. After setting at 25° C. for 6 minutes, the second water-based base coating composition was applied thereon. After setting at 25° C. for 3 minutes, an aluminum foil sheet was applied thereon and was peeled off with adherent uncured second water-based base coating film. The remaining first water-based base coating film was gathered with a spatula. A viscosity of the resultant sample (gathered material) was measured with a viscometer (MCR-301, produced by Anton Paar Corporation) at a shear rate of 0.01/s and at a temperature of 20° C.

Examples 2-7 and Comparative Examples 1-5

Test samples having multilayer coating film were prepared in the same manner as Example 1 except that the first water-based base coating composition and the second water-based base coating composition shown in Table 3 were used in place of the first water-based base coating composition (1) and the second water-based base coating composition (2). Measurement of viscosity (Pa·s) of an uncured water-based base coating film at step (2), and evaluation tests of design property, smoothness, sagging property were performed. The test results are shown in Table 3.

TABLE 3

| | | Examples | | | | | | | | Comparative examples | | | | |
|---|---|---|---|---|---|---|---|---|---|---|---|---|---|---|
| | | 1 | 2 | 3 | 4 | 5 | 6 | 7 | 8 | 1 | 2 | 3 | 4 | 5 |
| Type of coating composition | First water-based base coating composition | (1) | (2) | (3) | (4) | (5) | (6) | (1) | (1) | (7) | (8) | (9) | (2) | (2) |
| | Second water-based base coating composition | (1) | (1) | (1) | (2) | (3) | (4) | (5) | (6) | (1) | (1) | (1) | (7) | (8) |
| Evaluation | viscosity of uncured first water-based base coating film (Pa·s) | 78 | 88 | 80 | 74 | 69 | 63 | 52 | 99 | 38 | 32 | 41 | 43 | 74 |
| | Sagging property | 0 | 0 | 0 | 1 | 1 | 0 | 4 | 0 | 10 | 15 | 9 | 8 | 1 |
| | Design property (flip-flop property) | 3.96 | 4.01 | 4.00 | 3.97 | 3.84 | 3.67 | 3.76 | 3.97 | 3.32 | 3.09 | 3.30 | 3.43 | 3.38 |
| Smoothness | SW value | 15.6 | 15.7 | 15.1 | 14.8 | 15.2 | 16.3 | 16.8 | 20.3 | 22.8 | 20.5 | 22.7 | 23.7 | 15.3 |
| | LW value | 3.7 | 3.8 | 3.7 | 3.6 | 3.2 | 3.1 | 3.3 | 5.3 | 3.1 | 3.3 | 3.4 | 3.8 | 3.6 |

First water-based base coating compositions used in the above Examples contained the hydrophilic associated type viscosity agent. Therefore, the resulting multilayer coating film had excellent smoothness, excellent film appearance and no mixing of layers between a first water-based base coating film and a second water-based base coating film, even if second water-based base coating composition was applied without preheat in coating.

On the other hand, Comparative examples 1-3 contained a hydrophobic associated type viscosity agent and provided inferior sagging property, design property and film appearance (smoothness, in particular, inferior SW value). In use of a hydrophobic associated type viscosity agent, when a second water-based coating film was formed on an uncured first water-based coating film, water solvent in an uncured second water-based coating film seemed to be moved to the uncured first water-based coating film to provide lowing of viscosity of uncured first water-based coating film. Therefore, inferior evaluation results were obtained. Each of comparative examples 4-5 was a comparative example in which an amount of acrylic emulsion resin (A) was larger than the range of the invention (Comparative example 4), and an amount of acrylic emulsion resin (A) was smaller than the range of the invention (Comparative example 5). Both of the comparative examples provided inferior sagging property, design property or film appearance.

The present invention has an advantage that the method in use of specific compositions of the first water-based base coating composition and the second water-based base coating composition according to the present invention provides a multilayer coating film having excellent smoothness and design property, and excellent film appearance, even when the second water-based base coating composition is applied wet-on-wet on the uncured first water-based base coating film without preheat after the first water-based base coating composition is applied. The present invention therefore does not need a preheat step after the first water-based base coating composition is applied, which provides energy saving and reduction of $CO_2$ emissions in coating steps. In addition, the present invention has advantages of facility cost and coating line spaces.

What is claimed is:

1. A method for forming a multilayer coating film comprising the steps of:
   (1) applying a first water-based base coating composition on a surface of a coating material to form an uncured first water-based base coating film,
   (2) applying a second water-based base coating composition on the uncured first water-based base coating film to form an uncured second water-based base coating film,
   (3) applying a clear coating composition on the uncured second water-based base coating film to form an uncured clear coating film, and
   (4) simultaneously heating and curing the uncured first water-based base coating film, the uncured second water-based base coating film and the uncured clear coating film formed in the steps (1), (2) and (3) to form a multilayer coating film, wherein:
   the first water-based base coating composition comprises an acrylic emulsion resin, a curing agent and a hydrophilic associated type viscosity agent, wherein the curing agent is a melamine resin, and the hydrophilic associated type viscosity agent is a polyamide type viscosity agent; and
   the second water-based base coating composition comprises a film forming resin, and the film forming resin comprises:
   an acrylic emulsion resin (A) comprising a single layered acrylic emulsion resin (a) and a core-shell type acrylic emulsion resin (b) and each of (a) and (b) obtained by emulsion polymerization of a monomer mixture containing a (meth)acrylic acid alkyl ester (i), an ethylenically unsaturated monomer having an acid group (ii) and an ethylenically unsaturated monomer having a hydroxyl group (iii),
   a water soluble acrylic resin (B) prepared by co-polymerization of a hydroxyl group-containing monomer and another monomer, wherein the another monomer is at least one selected from the group consisting of a carboxyl group-containing monomer, a dicarboxylic acid monoester monomer, a (meth)acrylate alkylester monomer, an alicyclic group-containing monomer, a (meth)acrylic acid aminoalkyl ester monomer, a (meth)acrylic acid aminoalkyl amide monomer, an amido group-containing monomer, a vinyl cyanide monomer, a saturated aliphatic carboxylic acid vinyl ester monomer and a styrene monomer, and a water soluble polyester resin (C) prepared by polycondensation reaction of a polyalcohol with a polybasic acid or anhydride thereof, wherein the polyalcohol is at least one selected from the group consisting of ethylene glycol, diethylene glycol, polyethylene glycol, propylene glycol, dipropylene glycol, polypropylene glycol, neopentylglycol, 1,2-butanediol, 1,3-butanediol, 2,3-butanediol, 1,4-butanediol, 1,5-pentanediol, 1,6-hexanediol, hydrogenated bisphenol A, hydroxyalkylated bisphenol A, 1,4-cyclohexanedimethanol, 2,2-dimethyl-3-hydroxypropyl-2,2-dimethyl-3-hydroxypropionate, 2,2,4-trimethyl-1,3-pentanediol, N,N-bis-(2-hydroxyethyl) dimethyl hydantoin, polytetramethylene ether glycol, polycaprolactone polyol, glycerin, sorbitol, trimethylol ethane, trimethylol propane, trimethylol butane, hexanetriol, pentaerythritol, dipentaerythritol and tris-(hydroxyethyl) isocyanate, and wherein the polybasic acid or anhydride thereof is at least one selected from the group consisting of phthalic acid, phthalic anhydrite, tetrahydrophthalic acid, tetrahydrophthalic anhydrite, hexahydrophthalic acid, hexahydrophthalic anhydrite, methyl tetrahydrophthalic acid, methyl tetrahydrophthalic anhydrite, himic anhydride, trimellitic acid, trimellitic anhydride, pyromellitic acid, pyromellitic anhydride, isophthalic acid, terephthalic acid, maleic acid, maleic anhydride, fumaric acid, itaconic acid, adipic acid, azelaic acid, sebacic acid, succinic acid, succinic anhydride, lactic acid, dodecenyl succinic acid, dodecenyl succinic anhydride, cyclohexane-1,4-dicarboxylic acid and endo anhydride; and wherein, a rate represented by the following formula:

$$(A)/(A+B+C)$$

wherein (A) is a resin solid content by mass of the acrylic emulsion resin (A), and (A+B+C) is a total resin solid content by mass of the acrylic emulsion resin (A), the water soluble acrylic resin (B) and the water soluble polyester resin (C), is from 40% to 60% expressed in percentage.

2. The method for forming a multilayer coating film according to claim 1, wherein a viscosity at a temperature of 20° C. of the uncured first water-based base coating film after applying the second water-based base coating composition is from 45 to 100 Pa·s at a shear rate of 0.01/s.

3. The method for forming a multilayer coating film according to claim 1, wherein no heating or drying step is included between the step (1) and the step (2).

4. The method for forming a multilayer coating film according to claim 1, wherein the second water-based base coating composition further comprises a luster pigment.

5. The method for forming a multilayer coating film according to claim 1, wherein an amount of the water soluble polyester resin (C) in the second water-based base coating composition is 6% to 35% by mass.

* * * * *